United States Patent
Chhabria et al.

(10) Patent No.: US 12,373,622 B2
(45) Date of Patent: Jul. 29, 2025

(54) REDUCING CROSSTALK PESSIMISM USING GPU-ACCELERATED GATE SIMULATION AND MACHINE LEARNING

(71) Applicant: NVIDIA Corporation, Santa Clara, CA (US)

(72) Inventors: Vidya Chhabria, Minneapolis, MN (US); Benjamin Andrew Keller, Oakland, CA (US); Yanqing Zhang, San Jose, CA (US); Brucek Kurdo Khailany, Austin, TX (US); Haoxing Ren, Austin, TX (US)

(73) Assignee: NVIDIA CORPORATION, Santa Clara, CA (US)

( * ) Notice: Subject to any disclaimer, the term of this patent is extended or adjusted under 35 U.S.C. 154(b) by 779 days.

(21) Appl. No.: 17/540,167

(22) Filed: Dec. 1, 2021

(65) Prior Publication Data
US 2023/0089606 A1    Mar. 23, 2023

Related U.S. Application Data

(60) Provisional application No. 63/246,682, filed on Sep. 21, 2021.

(51) Int. Cl.
*G06F 30/3312* (2020.01)
*G06F 30/27* (2020.01)
(Continued)

(52) U.S. Cl.
CPC .......... *G06F 30/3312* (2020.01); *G06F 30/27* (2020.01); *G06N 20/00* (2019.01); *G06F 2119/12* (2020.01)

(58) Field of Classification Search
CPC .. G06F 30/3312; G06F 30/27; G06F 2119/12; G06N 20/00; G06N 3/0495; G06N 3/084
See application file for complete search history.

(56) References Cited

U.S. PATENT DOCUMENTS 6,510,540 B1 * 1/2003 Krauter ................. G06F 30/367
                                                      716/115
6,615,395 B1 * 9/2003 Hathaway ........... G06F 30/3312
                                                      716/113
(Continued)

FOREIGN PATENT DOCUMENTS

WO    WO-2018188081 A1 * 10/2018 ....... G01R 31/31725

OTHER PUBLICATIONS

D. Das, K. Killpack, C. Kashyap, A. Jas and H. Zhou, "Pessimism Reduction in Coupling-Aware Static Timing Analysis Using Timing and Logic Filtering," in IEEE Transactions on Computer-Aided Design of Integrated Circuits and Systems, vol. 29, No. 3, pp. 466-478, Mar. 2010. (Year: 2010).*

(Continued)

*Primary Examiner* — Jack Chiang
(74) *Attorney, Agent, or Firm* — Zilka-Kotab, P.C.

(57) ABSTRACT

To facilitate crosstalk analysis for an IC design, a plurality of input vectors are input into a gate-level simulation. In response, the gate-level simulation determines timing windows for all nets within the IC design, may perform aggressor pruning, and may then determine and output aggressor/victim pairs and associated features for the IC design. This gate-level simulation may be accelerated utilizing one or more graphics processor units (GPUs). Additionally, the aggressor/victim pairs and associated features for the IC design are then input into a trained machine learning environment, which outputs predicted delta delays for each of the aggressor/victim pairs. In this way, crosstalk analysis may be performed more accurately and efficiently.

19 Claims, 8 Drawing Sheets

(51) Int. Cl.
*G06F 119/12* (2020.01)
*G06N 20/00* (2019.01)

(56) References Cited

U.S. PATENT DOCUMENTS

| | | | | |
|---|---|---|---|---|
| 7,359,843 | B1* | 4/2008 | Keller | G06F 30/3312 703/2 |
| 7,363,605 | B1* | 4/2008 | Kondratyev | G06F 30/3312 716/113 |
| 7,549,134 | B1* | 6/2009 | Li | G06F 30/367 716/106 |
| 7,562,323 | B1* | 7/2009 | Bai | G06F 30/3312 703/2 |
| 10,223,493 | B1* | 3/2019 | Spyrou | G06F 30/398 |
| 10,565,336 | B2* | 2/2020 | Morsey | H04B 3/32 |
| 10,643,019 | B1* | 5/2020 | Han | G06F 30/398 |
| 10,776,547 | B1* | 9/2020 | Gupta | G06F 16/9024 |
| 10,915,685 | B1* | 2/2021 | Gupta | G06F 30/327 |
| 11,042,806 | B1* | 6/2021 | Jiang | G06F 30/398 |
| 11,222,155 | B1* | 1/2022 | Tehrani | G06F 30/3315 |
| 11,461,523 | B1* | 10/2022 | Chen | G06F 30/3312 |
| 2002/0133325 | A1* | 9/2002 | Hoare, II | G06F 30/20 703/17 |
| 2002/0166101 | A1* | 11/2002 | Casavant | G06F 30/327 716/114 |
| 2003/0229873 | A1* | 12/2003 | Casavant | G06F 30/327 716/115 |
| 2006/0112359 | A1* | 5/2006 | Becer | G06F 30/3312 716/113 |
| 2009/0224356 | A1* | 9/2009 | Chandra | G06F 30/23 716/113 |
| 2010/0218152 | A1* | 8/2010 | Tehrani | G06F 30/33 716/113 |
| 2016/0292344 | A1* | 10/2016 | Griyage | H04B 3/32 |
| 2017/0076116 | A1* | 3/2017 | Chen | G06F 21/554 |
| 2017/0308638 | A1* | 10/2017 | Gothi | G06F 30/3312 |
| 2018/0121585 | A1* | 5/2018 | Cherupalli | G06F 30/337 |
| 2018/0121595 | A1* | 5/2018 | Hathaway | G06F 30/3323 |
| 2019/0362045 | A1* | 11/2019 | Morsey | G06F 30/3312 |
| 2020/0074276 | A1* | 3/2020 | Cooke | G06N 3/08 |
| 2020/0183964 | A1* | 6/2020 | Wu | G06F 16/313 |
| 2020/0242206 | A1* | 7/2020 | Kim | G06F 30/3312 |
| 2021/0056468 | A1* | 2/2021 | Cao | G06N 20/00 |
| 2022/0398369 | A1* | 12/2022 | Tehrani | G06F 30/367 |
| 2023/0237229 | A1* | 7/2023 | Yuan | G06F 30/3312 716/132 |

OTHER PUBLICATIONS

T. El Motassadeq, V. Sarathi, S. Thameem and M. Nijam, "SPICE versus STA tools: Challenges and tips for better correlation," 2009 IEEE International SOC Conference (SOCC), Belfast, UK, 2009, pp. 325-328. (Year: 2009).*

Tanaka et al., "Crosstalk Pessimism Reduction with Path Base Analysis, "10th International Symposium on Quality Electronic Design, 2009, 6 pages.

Fatemi et al., "Crosstalk Timing Windows Overlap in Statistical Static Timing Analysis," 14th International Symposium on Quality Electronic Design (ISQED), Mar. 2013, 7 pages.

Chen et al., "Crosstalk-Aware Signal Probability-Based Dynamic Statistical Timing Analysis," 16th International Symposium on Quality Electronic Design, Mar. 2015, 6 pages.

Becer et al., "Pessimism Reduction in Crosstalk Noise Aware Sta," ICCAD-2005, IEEE/ACM International Conference on Computer-Aided Design, 2005, pp. 953-961.

* cited by examiner

US 12,373,622 B2

REDUCING CROSSTALK PESSIMISM USING GPU-ACCELERATED GATE SIMULATION AND MACHINE LEARNING

FIELD OF THE INVENTION

The present invention relates to integrated circuit analysis, and more particularly to determining crosstalk within an integrated circuit design.

BACKGROUND

Crosstalk timing signoff, also known as signal integrity (SI) analysis, is the process of performing timing signoff on a placed-and-routed digital design while accounting for the impact of undesired wire-to-wire interactions, or crosstalk, on signal timing. Crosstalk analysis is difficult to perform accurately. Typical integrated circuit (IC) designs have millions of nets, and each victim net can have tens or hundreds of aggressor nets that can affect the rate of signal propagation through the victim net, resulting in a huge number of combinations to analyze. The extent to which victim nets are affected by aggressors cannot be determined statically because crosstalk only occurs if the victim and aggressor toggle simultaneously. Simulations are slow and cannot practically be scaled to cover a full IC design.

Existing solutions to SI analysis perform a static analysis of the netlist and therefore must make worst-case assumptions about aggressor and victim paths toggling simultaneously, resulting in a pessimistic timing analysis. This pessimism is typically mitigated by applying blanket heuristics but this approach may be either optimistic (which can result in timing failures) or pessimistic (which can require additional margin).

There is therefore a need for an improved crosstalk analysis of an IC design.

DETAILED DESCRIPTION

An integrated circuit (IC) design has many interconnected components (e.g., physical wires that connect two or more components within the IC). These interconnected components are known as nets. When an integrated circuit (IC) is being designed, crosstalk analysis may be performed. This crosstalk analysis may determine instances within the IC where a first net (e.g., an aggressor net) exhibits parasitic capacitive coupling with a second net (e.g., a victim net) due to physical proximity, and the switching of the first net and the second net overlap (e.g., both nets switch at the same time (or within a predetermined time threshold)). In these instances, the first net may cause an undesirable effect on the second net.

To facilitate this crosstalk analysis for an IC design, a plurality of input vectors are input into a gate-level simulation. In response, the gate-level simulation determines timing windows for all nets within the IC design, may perform aggressor pruning, and may then determine and output aggressor/victim pairs and associated features for the IC design. This gate-level simulation may be accelerated utilizing one or more graphics processor units (GPUs).

Additionally, the aggressor/victim pairs and associated features for the IC design are then input into a trained machine learning environment, which outputs predicted delta delays for each of the aggressor/victim pairs. In this way, crosstalk analysis may be performed more accurately and efficiently.

Figure 1:
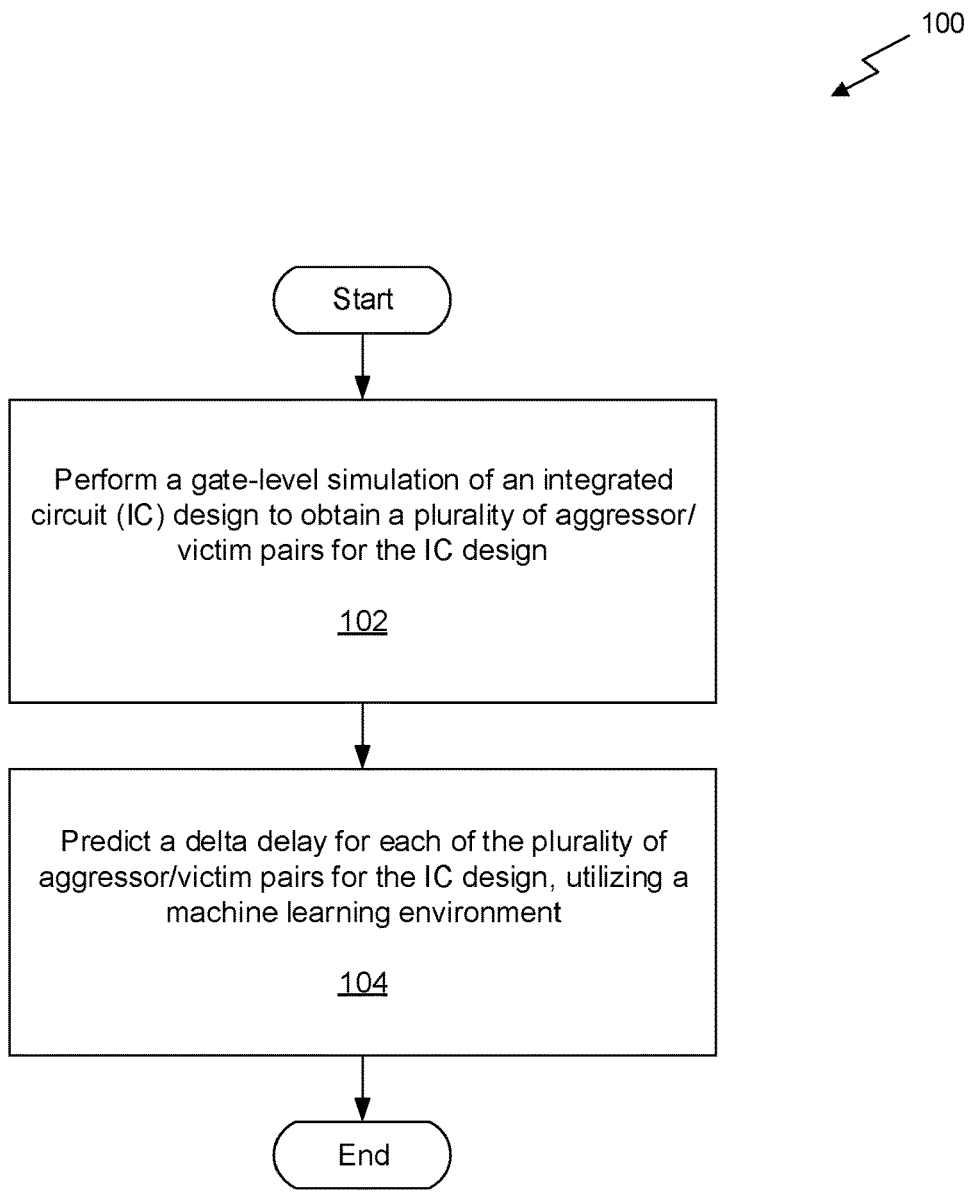
FIG. 1 illustrates a flowchart of a method for reducing crosstalk pessimism using GPU-accelerated gate simulation and machine learning, in accordance with an embodiment.

FIG. 1 illustrates a flowchart of a method 100 for reducing crosstalk pessimism using GPU-accelerated gate simulation and machine learning, in accordance with an embodiment. Although method 100 is described in the context of a processing unit, the method 100 may also be performed by a program, custom circuitry, or by a combination of custom circuitry and a program. For example, the method 100 may be executed by a GPU (graphics processing unit), CPU (central processing unit), or any processing element. Furthermore, persons of ordinary skill in the art will understand that any system that performs method 100 is within the scope and spirit of embodiments of the present invention.

As shown in operation 102, a gate-level simulation of an integrated circuit (IC) design is performed to obtain a plurality of aggressor/victim pairs for the IC design. In one embodiment, the IC design may be an entire IC or a portion thereof (e.g., a partition of an overall IC design, etc.). In another embodiment, the gate-level simulation may be accelerated utilizing one or more graphics processor units (GPUs).

Additionally, in one embodiment, a plurality of input vectors may be input into the gate-level simulation. For example, the plurality of input vectors may be random or may represent one or more predetermined workloads. In another example, each of the plurality of input vectors may include vectors of data to be processed utilizing the IC.

Further, in one embodiment, given the plurality of input vectors, the gate-level simulation may determine timing windows for all nets within the IC design. For example, a net within the IC design may include two or more interconnected components within the IC design (e.g., a representation of a physical wire that connects two or more components within the IC, etc.). In another example, for each of the plurality of nets, the timing window may include a time when the net switches/toggles (e.g., changes from a first voltage to a second voltage, etc.).

Further still, in one embodiment, the gate-level simulation may then determine and output aggressor/victim pairs for the IC design, based on the timing windows for all nets within the IC design. For example, if a first net (e.g., an aggressor net) is capacitively coupled with a second net (e.g., a victim net), and the signal transitions of the first net and the second net overlap (e.g., both nets switch at the same time (or within a predetermined time threshold)), the first net may cause an undesirable effect on the second net. In another example, the first net switching at the same time as the second net in the opposite direction may cause a delayed transition (e.g., a positive delta delay) in the second net. In yet another example, the first net switching at the same time as the second net in the same direction may cause an accelerated transition (e.g., a negative delta delay) in the second net.

Also, in one embodiment, in response to determining that a first net (e.g., an aggressor net) is capacitively coupled with a second net (e.g., a victim net), and the signal transitions of the first net and the second net overlap, the first net and the second net may be identified and output as an aggressor/victim pair. In another embodiment, the gate-level simulation may perform aggressor pruning. For example, the gate-level simulation may eliminate one or more aggressor nets within the IC design.

In addition, in one embodiment, the aggressor pruning may include logical correlation-based pruning. For example, if a first net (e.g., an aggressor net) is capacitively coupled with a second net (e.g., a victim net), but signal transitions of the first net and the second net never overlap for all of the plurality of input vectors, the first net may be identified as a false aggressor and the first net and the second net may be removed from consideration as an aggressor/victim pair.

Furthermore, in one embodiment, the aggressor pruning may include distance-based pruning. For example, if a first net (e.g., an aggressor net) is capacitively coupled with a second net (e.g., a victim net), and the first net switches more than a predetermined time threshold before the second net (and/or the first net switches more than a predetermined time threshold after the second net) for all of the plurality of input vectors, the first net may be identified as a false aggressor and the first net and the second net may be removed from consideration as an aggressor/victim pair.

In this way, when the probability of a first net and a second net switching simultaneously is zero for the plurality of input vectors, the first net and the second net may be removed from consideration as an aggressor/victim pair.

Further still, in one embodiment, all identified aggressor/victim pairs determined within the IC design may be output by the gate-level simulation in response to the plurality of input vectors. In another embodiment, the gate-level simulation may also determine and output associated features for each of the identified aggressor/victim pairs. For example, the associated features for each pair may include a victim slew value, an aggressor slew value, a bump value (e.g., a percentage of a voltage of the victim net that is perturbed due to the aggressor net), victim load (e.g., a load capacitance on the victim net), and/or a relative distance between the aggressor net and the victim net (e.g., a difference between an arrival (switching) time of the aggressor net and an arrival (switching) time of the victim net).

Also, in one embodiment, a predetermined number of aggressor nets may be determined within the IC design that switch at a time closest to their associated victim nets. For example, these aggressor nets may cause the largest bump in their respective victim nets. In another example, this predetermined number of aggressor/victim pairs may then be selected.

Additionally, as shown in operation 104, a delta delay for each of the plurality of aggressor/victim pairs for the IC design is predicted, utilizing a machine learning environment. In one embodiment, the machine learning environment may include a multiple layer perceptron. In another embodiment, the machine learning environment may take each of the plurality of aggressor/victim pairs, as well as the associated features for each pair, as input.

Further, in one embodiment, for each of the plurality of aggressor/victim pairs, the machine learning environment may output a predicted delta delay for the aggressor/victim pair. For example, for a given aggressor/victim pair, the delta delay may indicate an overall impact (in terms of bump) that the aggressor net has on the victim net over a plurality of various start times.

Further still, in one embodiment, the machine learning environment may first be trained. For example, exemplary aggressor/victim pairs may be selected (e.g., within the same or a different IC design). In another example, for each exemplary aggressor/victim pair, training data may be obtained by sweeping start times of an aggressor net across a static victim net start time and estimating a delta delay for each aggressor net start time (e.g., using a SPICE simulator, etc.). In yet another example, for each aggressor/victim pair, the associated features for the pair and the estimated delta delay for the pair may be input into the machine learning environment as training data to train the machine learning environment. In still another example, the trained machine learning environment may then be deployed after training.

Also, in one embodiment, the predicted delta delays for each of the plurality of aggressor/victim pairs may be used to perform crosstalk analysis for the IC design. In another embodiment, the IC design may be adjusted, based on the predicted delta delays for each of the plurality of aggressor/victim pairs. For example, the IC design may be changed to avoid predicted delta delays above a predetermined threshold. Also, the IC may be constructed utilizing the changed IC design.

In this way, an accuracy of crosstalk analysis for IC designs may be improved. This improved analysis may in turn improve the accuracy of IC designs, which may optimize the performance of such designs while avoiding physical failure of such designs (e.g., silicon failure) and software workarounds to avoid such failure.

Additionally, by pruning false aggressors utilizing a gate-level simulation, fewer aggressor/victim pairs may need to be considered during crosstalk analysis, which may improve the performance of one or more hardware computing devices performing such crosstalk analysis. Also, predicting delta delays utilizing a trained machine learning environment may avoid resource-intensive simulation during crosstalk analysis, which may also improve the performance of one or more hardware computing devices performing such crosstalk analysis.

Figure 2:
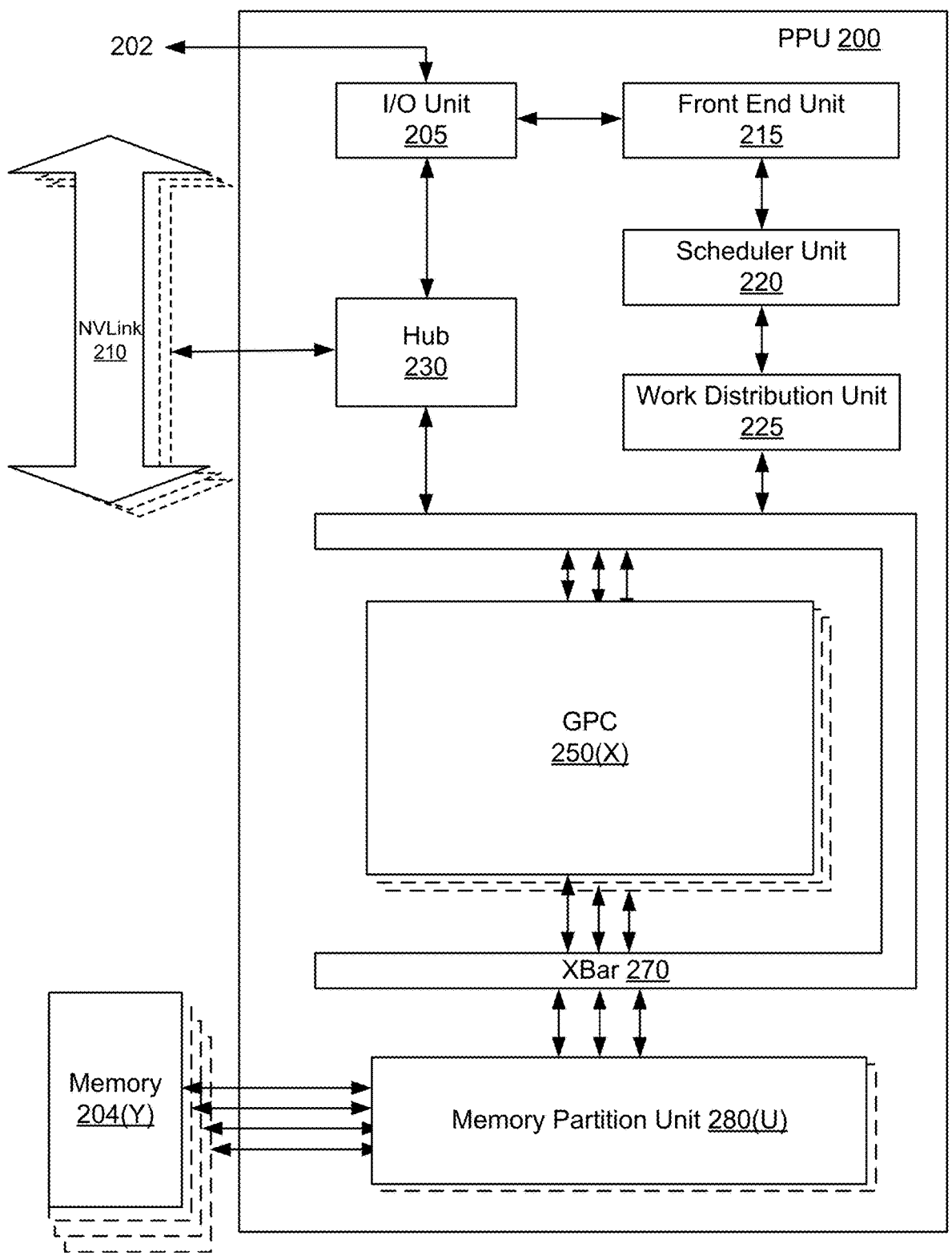
FIG. 2 illustrates a parallel processing unit, in accordance with an embodiment.

In yet another embodiment, the testing may be performed utilizing a parallel processing unit (PPU) such as the PPU 200 illustrated in FIG. 2.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Parallel Processing Architecture

FIG. 2 illustrates a parallel processing unit (PPU) 200, in accordance with an embodiment. In an embodiment, the PPU 200 is a multi-threaded processor that is implemented on one or more integrated circuit devices. The PPU 200 is a latency hiding architecture designed to process many threads in parallel. A thread (i.e., a thread of execution) is an instantiation of a set of instructions configured to be executed by the PPU 200. In an embodiment, the PPU 200 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 200 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 200 may be configured to accelerate thousands of High Performance Computing (HPC), data center, and machine learning applications. The PPU 200 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 2, the PPU 200 includes an Input/Output (I/O) unit 205, a front end unit 215, a scheduler unit 220, a work distribution unit 225, a hub 230, a crossbar (Xbar) 270, one or more general processing clusters (GPCs) 250, and one or more partition units 280. The PPU 200 may be connected to a host processor or other PPUs 200 via one or more high-speed NVLink 210 interconnect. The PPU 200 may be connected to a host processor or other peripheral devices via an interconnect 202. The PPU 200 may also be connected to a local memory comprising a number of memory devices 204. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 210 interconnect enables systems to scale and include one or more PPUs 200 combined with one or more CPUs, supports cache coherence between the PPUs 200 and CPUs, and CPU mastering. Data and/or commands may be transmitted by the NVLink 210 through the hub 230 to/from other units of the PPU 200 such as one or more copy engines, a video encoder, a video decoder, a power management unit, etc. (not explicitly shown). The NVLink 210 is described in more detail in conjunction with FIG. 4B.

The I/O unit 205 is configured to transmit and receive communications (i.e., commands, data, etc.) from a host processor (not shown) over the interconnect 202. The I/O unit 205 may communicate with the host processor directly via the interconnect 202 or through one or more intermediate devices such as a memory bridge. In an embodiment, the I/O unit 205 may communicate with one or more other processors, such as one or more the PPUs 200 via the interconnect 202. In an embodiment, the I/O unit 205 implements a Peripheral Component Interconnect Express (PCIe) interface for communications over a PCIe bus and the interconnect 202 is a PCIe bus. In alternative embodiments, the I/O unit 205 may implement other types of well-known interfaces for communicating with external devices.

The I/O unit 205 decodes packets received via the interconnect 202. In an embodiment, the packets represent commands configured to cause the PPU 200 to perform various operations. The I/O unit 205 transmits the decoded commands to various other units of the PPU 200 as the commands may specify. For example, some commands may be transmitted to the front end unit 215. Other commands may be transmitted to the hub 230 or other units of the PPU 200 such as one or more copy engines, a video encoder, a video decoder, a power management unit, etc. (not explicitly shown). In other words, the I/O unit 205 is configured to route communications between and among the various logical units of the PPU 200.

In an embodiment, a program executed by the host processor encodes a command stream in a buffer that provides workloads to the PPU 200 for processing. A workload may comprise several instructions and data to be processed by those instructions. The buffer is a region in a memory that is accessible (i.e., read/write) by both the host processor and the PPU 200. For example, the I/O unit 205 may be configured to access the buffer in a system memory connected to the interconnect 202 via memory requests transmitted over the interconnect 202. In an embodiment, the host processor writes the command stream to the buffer and then transmits a pointer to the start of the command stream to the PPU 200. The front end unit 215 receives pointers to one or more command streams. The front end unit 215 manages the one or more streams, reading commands from the streams and forwarding commands to the various units of the PPU 200.

The front end unit 215 is coupled to a scheduler unit 220 that configures the various GPCs 250 to process tasks defined by the one or more streams. The scheduler unit 220 is configured to track state information related to the various tasks managed by the scheduler unit 220. The state may indicate which GPC 250 a task is assigned to, whether the task is active or inactive, a priority level associated with the task, and so forth. The scheduler unit 220 manages the execution of a plurality of tasks on the one or more GPCs 250.

The scheduler unit 220 is coupled to a work distribution unit 225 that is configured to dispatch tasks for execution on the GPCs 250. The work distribution unit 225 may track a number of scheduled tasks received from the scheduler unit 220. In an embodiment, the work distribution unit 225 manages a pending task pool and an active task pool for each of the GPCs 250. The pending task pool may comprise a number of slots (e.g., 32 slots) that contain tasks assigned to be processed by a particular GPC 250. The active task pool may comprise a number of slots (e.g., 4 slots) for tasks that are actively being processed by the GPCs 250. As a GPC 250 finishes the execution of a task, that task is evicted from the active task pool for the GPC 250 and one of the other tasks from the pending task pool is selected and scheduled for execution on the GPC 250. If an active task has been idle on the GPC 250, such as while waiting for a data dependency to be resolved, then the active task may be evicted from the GPC 250 and returned to the pending task pool while another task in the pending task pool is selected and scheduled for execution on the GPC 250.

The work distribution unit 225 communicates with the one or more GPCs 250 via XBar 270. The XBar 270 is an interconnect network that couples many of the units of the PPU 200 to other units of the PPU 200. For example, the XBar 270 may be configured to couple the work distribution unit 225 to a particular GPC 250. Although not shown explicitly, one or more other units of the PPU 200 may also be connected to the XBar 270 via the hub 230.

The tasks are managed by the scheduler unit 220 and dispatched to a GPC 250 by the work distribution unit 225. The GPC 250 is configured to process the task and generate results. The results may be consumed by other tasks within the GPC 250, routed to a different GPC 250 via the XBar 270, or stored in the memory 204. The results can be written to the memory 204 via the partition units 280, which implement a memory interface for reading and writing data to/from the memory 204. The results can be transmitted to another PPU 200 or CPU via the NVLink 210. In an embodiment, the PPU 200 includes a number U of partition units 280 that is equal to the number of separate and distinct memory devices 204 coupled to the PPU 200. A partition unit 280 will be described in more detail below in conjunction with FIG. 3B.

In an embodiment, a host processor executes a driver kernel that implements an application programming interface (API) that enables one or more applications executing on the host processor to schedule operations for execution on the PPU 200. In an embodiment, multiple compute applications are simultaneously executed by the PPU 200 and the PPU 200 provides isolation, quality of service (QoS), and independent address spaces for the multiple compute applications. An application may generate instructions (i.e., API calls) that cause the driver kernel to generate one or more tasks for execution by the PPU 200. The driver kernel outputs tasks to one or more streams being processed by the PPU 200. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 4A.

Figure 3A:
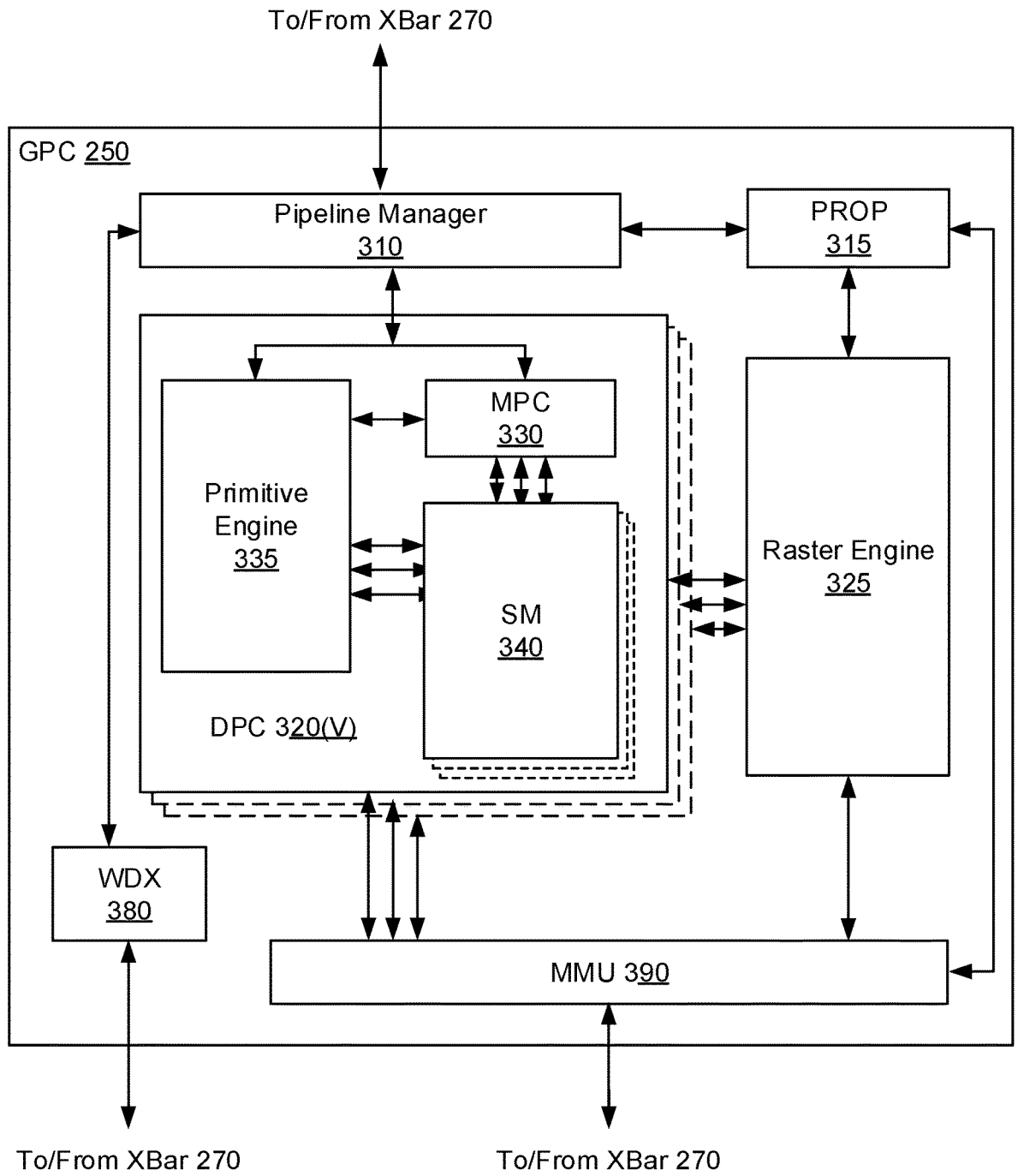
FIG. 3A illustrates a general processing cluster within the parallel processing unit of FIG. 2, in accordance with an embodiment.

FIG. 3A illustrates a GPC 250 of the PPU 200 of FIG. 2, in accordance with an embodiment. As shown in FIG. 3A, each GPC 250 includes a number of hardware units for processing tasks. In an embodiment, each GPC 250 includes a pipeline manager 310, a pre-raster operations unit (PROP) 315, a raster engine 325, a work distribution crossbar (WDX) 380, a memory management unit (MMU) 390, and one or more Data Processing Clusters (DPCs) 320. It will be appreciated that the GPC 250 of FIG. 3A may include other hardware units in lieu of or in addition to the units shown in FIG. 3A.

In an embodiment, the operation of the GPC 250 is controlled by the pipeline manager 310. The pipeline manager 310 manages the configuration of the one or more DPCs 320 for processing tasks allocated to the GPC 250. In an embodiment, the pipeline manager 310 may configure at least one of the one or more DPCs 320 to implement at least a portion of a graphics rendering pipeline. For example, a DPC 320 may be configured to execute a vertex shader program on the programmable streaming multiprocessor (SM) 340. The pipeline manager 310 may also be configured to route packets received from the work distribution unit 225 to the appropriate logical units within the GPC 250. For example, some packets may be routed to fixed function hardware units in the PROP 315 and/or raster engine 325 while other packets may be routed to the DPCs 320 for processing by the primitive engine 335 or the SM 340. In an embodiment, the pipeline manager 310 may configure at least one of the one or more DPCs 320 to implement a neural network model and/or a computing pipeline.

Figure 3B:
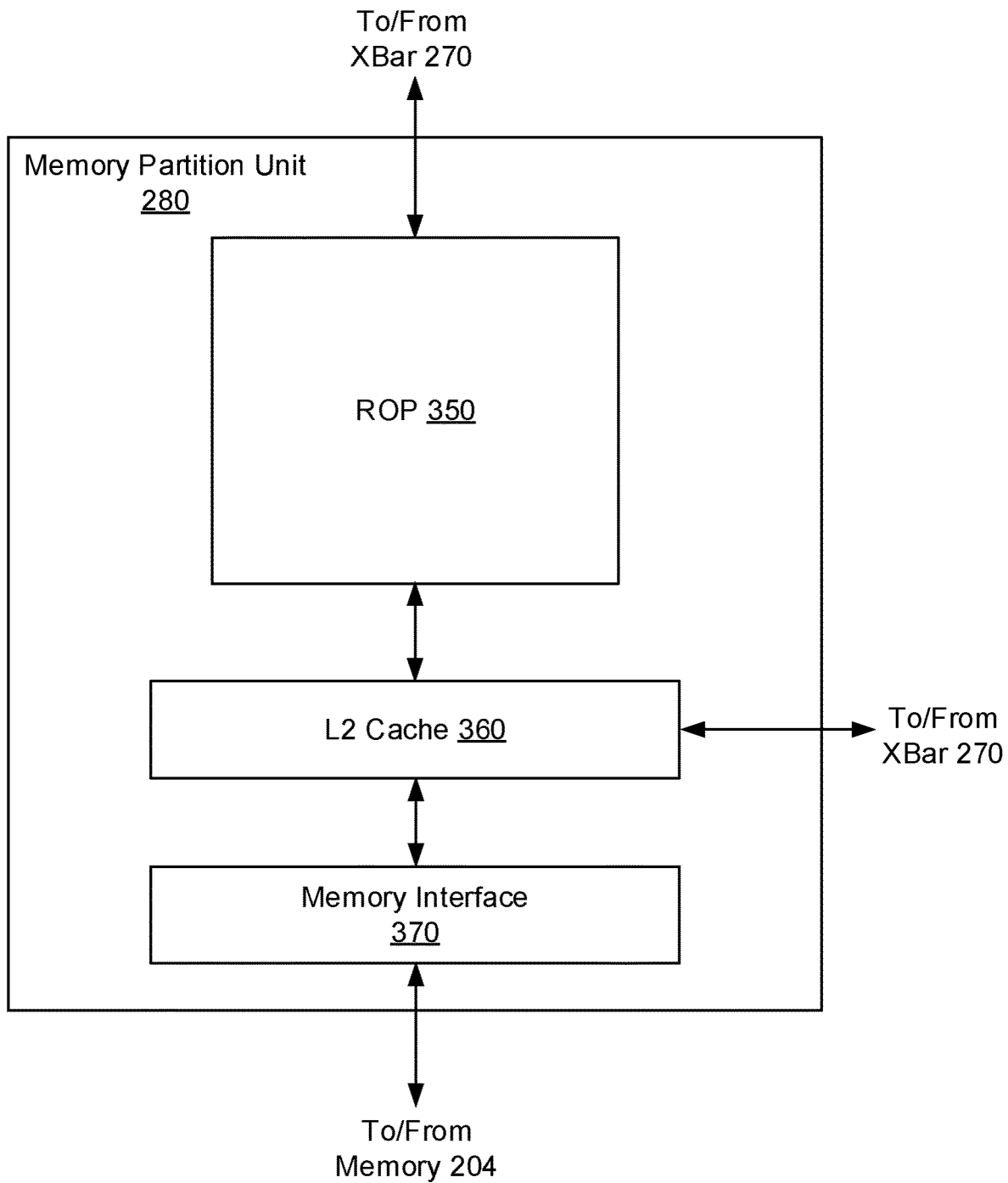
FIG. 3B illustrates a memory partition unit of the parallel processing unit of FIG. 2, in accordance with an embodiment.

The PROP unit 315 is configured to route data generated by the raster engine 325 and the DPCs 320 to a Raster Operations (ROP) unit, described in more detail in conjunction with FIG. 3B. The PROP unit 315 may also be configured to perform optimizations for color blending, organize pixel data, perform address translations, and the like.

The raster engine 325 includes a number of fixed function hardware units configured to perform various raster operations. In an embodiment, the raster engine 325 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 325 comprises fragments to be processed, for example, by a fragment shader implemented within a DPC 320.

Each DPC 320 included in the GPC 250 includes an M-Pipe Controller (MPC) 330, a primitive engine 335, and one or more SMs 340. The MPC 330 controls the operation of the DPC 320, routing packets received from the pipeline manager 310 to the appropriate units in the DPC 320. For example, packets associated with a vertex may be routed to the primitive engine 335, which is configured to fetch vertex attributes associated with the vertex from the memory 204. In contrast, packets associated with a shader program may be transmitted to the SM 340.

The SM 340 comprises a programmable streaming processor that is configured to process tasks represented by a number of threads. Each SM 340 is multi-threaded and configured to execute a plurality of threads (e.g., 32 threads) from a particular group of threads concurrently. In an embodiment, the SM 340 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 340 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 340 will be described in more detail below in conjunction with FIG. 4A.

The MMU 390 provides an interface between the GPC 250 and the partition unit 280. The MMU 390 may provide translation of virtual addresses into physical addresses, memory protection, and arbitration of memory requests. In an embodiment, the MMU 390 provides one or more translation lookaside buffers (TLBs) for performing translation of virtual addresses into physical addresses in the memory 204.

FIG. 3B illustrates a memory partition unit 280 of the PPU 200 of FIG. 2, in accordance with an embodiment. As shown in FIG. 3B, the memory partition unit 280 includes a Raster Operations (ROP) unit 350, a level two (L2) cache 360, and a memory interface 370. The memory interface 370 is coupled to the memory 204. Memory interface 370 may implement 32, 64, 128, 1024-bit data buses, or the like, for high-speed data transfer. In an embodiment, the PPU 200 incorporates U memory interfaces 370, one memory interface 370 per pair of partition units 280, where each pair of partition units 280 is connected to a corresponding memory device 204. For example, PPU 200 may be connected to up to Y memory devices 204, such as high bandwidth memory stacks or graphics double-data-rate, version 5, synchronous dynamic random access memory, or other types of persistent storage.

In an embodiment, the memory interface 370 implements an HBM2 memory interface and Y equals half U. In an embodiment, the HBM2 memory stacks are located on the same physical package as the PPU 200, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 204 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 200 process very large datasets and/or run applications for extended periods.

In an embodiment, the PPU 200 implements a multi-level memory hierarchy. In an embodiment, the memory partition unit 280 supports a unified memory to provide a single unified virtual address space for CPU and PPU 200 memory, enabling data sharing between virtual memory systems. In an embodiment the frequency of accesses by a PPU 200 to memory located on other processors is traced to ensure that memory pages are moved to the physical memory of the PPU 200 that is accessing the pages more frequently. In an embodiment, the NVLink 210 supports address translation services allowing the PPU 200 to directly access a CPU's page tables and providing full access to CPU memory by the PPU 200.

In an embodiment, copy engines transfer data between multiple PPUs 200 or between PPUs 200 and CPUs. The copy engines can generate page faults for addresses that are not mapped into the page tables. The memory partition unit 280 can then service the page faults, mapping the addresses into the page table, after which the copy engine can perform the transfer. In a conventional system, memory is pinned (i.e., non-pageable) for multiple copy engine operations between multiple processors, substantially reducing the available memory. With hardware page faulting, addresses can be passed to the copy engines without worrying if the memory pages are resident, and the copy process is transparent.

Data from the memory 204 or other system memory may be fetched by the memory partition unit 280 and stored in the L2 cache 360, which is located on-chip and is shared between the various GPCs 250. As shown, each memory partition unit 280 includes a portion of the L2 cache 360 associated with a corresponding memory device 204. Lower level caches may then be implemented in various units within the GPCs 250. For example, each of the SMs 340 may implement a level one (L1) cache. The L1 cache is private memory that is dedicated to a particular SM 340. Data from the L2 cache 360 may be fetched and stored in each of the L1 caches for processing in the functional units of the SMs 340. The L2 cache 360 is coupled to the memory interface 370 and the XBar 270.

The ROP unit 350 performs graphics raster operations related to pixel color, such as color compression, pixel blending, and the like. The ROP unit 350 also implements depth testing in conjunction with the raster engine 325, receiving a depth for a sample location associated with a pixel fragment from the culling engine of the raster engine 325. The depth is tested against a corresponding depth in a depth buffer for a sample location associated with the fragment. If the fragment passes the depth test for the sample location, then the ROP unit 350 updates the depth buffer and transmits a result of the depth test to the raster engine 325. It will be appreciated that the number of partition units 280 may be different than the number of GPCs 250 and, therefore, each ROP unit 350 may be coupled to each of the GPCs 250. The ROP unit 350 tracks packets received from the different GPCs 250 and determines which GPC 250 that a result generated by the ROP unit 350 is routed to through the Xbar 270. Although the ROP unit 350 is included within the memory partition unit 280 in FIG. 3B, in other embodiment, the ROP unit 350 may be outside of the memory partition unit 280. For example, the ROP unit 350 may reside in the GPC 250 or another unit.

Figure 4A:
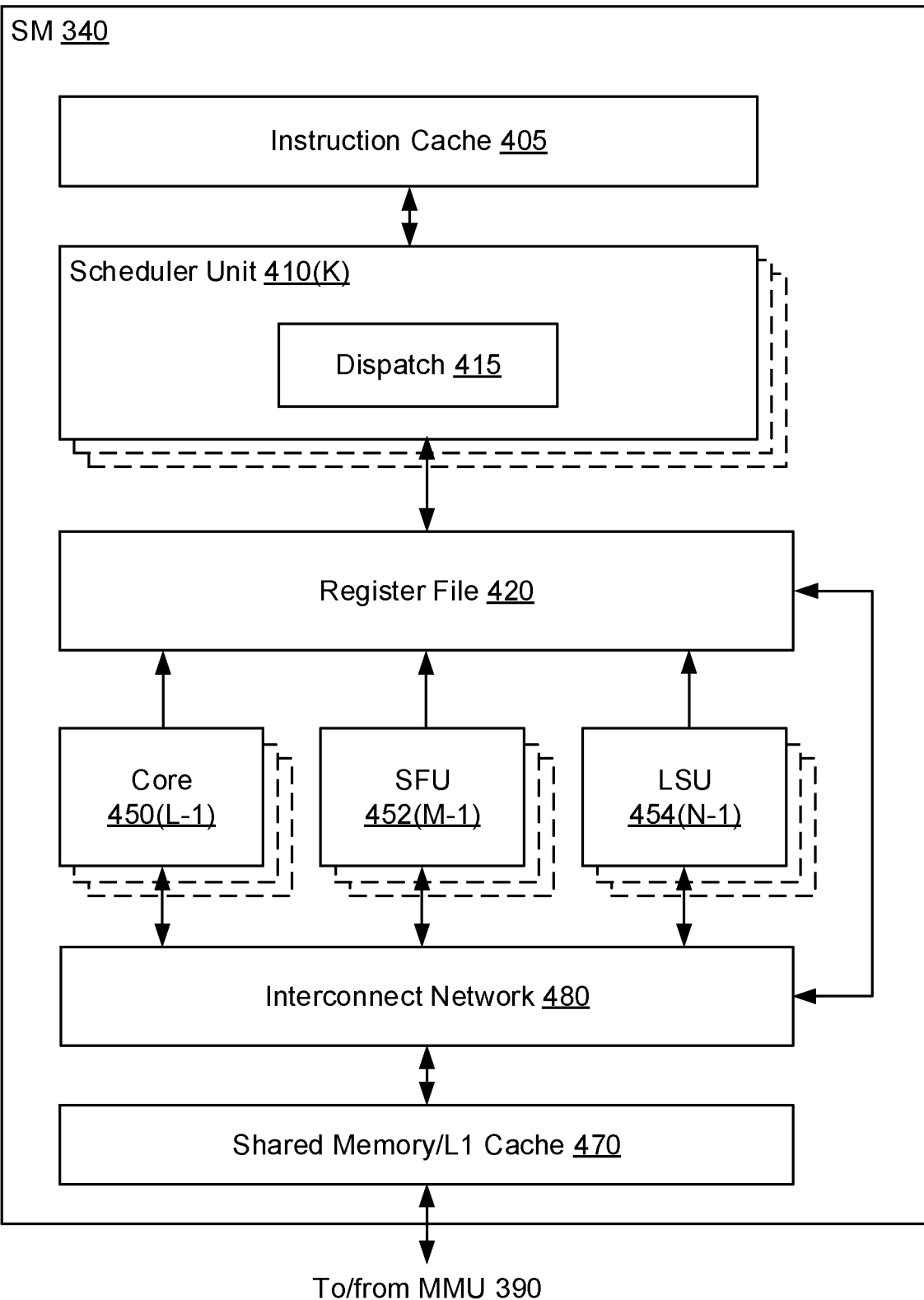
FIG. 4A illustrates the streaming multi-processor of FIG. 3A, in accordance with an embodiment.

FIG. 4A illustrates the streaming multi-processor 340 of FIG. 3A, in accordance with an embodiment. As shown in FIG. 4A, the SM 340 includes an instruction cache 405, one or more scheduler units 410(K), a register file 420, one or more processing cores 450, one or more special function units (SFUs) 452, one or more load/store units (LSUs) 454, an interconnect network 480, a shared memory/L1 cache 470.

As described above, the work distribution unit 225 dispatches tasks for execution on the GPCs 250 of the PPU 200. The tasks are allocated to a particular DPC 320 within a GPC 250 and, if the task is associated with a shader program, the task may be allocated to an SM 340. The scheduler unit 410(K) receives the tasks from the work distribution unit 225 and manages instruction scheduling for one or more thread blocks assigned to the SM 340. The scheduler unit 410(K) schedules thread blocks for execution as warps of parallel threads, where each thread block is allocated at least one warp. In an embodiment, each warp executes 32 threads. The scheduler unit 410(K) may manage a plurality of different thread blocks, allocating the warps to the different thread blocks and then dispatching instructions from the plurality of different cooperative groups to the various functional units (i.e., cores 450, SFUs 452, and LSUs 454) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (i.e., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (i.e., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 415 is configured to transmit instructions to one or more of the functional units. In the embodiment, the scheduler unit 410(K) includes two dispatch units 415 that enable two different instructions from the same warp to be dispatched during each clock cycle. In alternative embodiments, each scheduler unit 410(K) may include a single dispatch unit 415 or additional dispatch units 415.

Each SM 340 includes a register file 420 that provides a set of registers for the functional units of the SM 340. In an embodiment, the register file 420 is divided between each of the functional units such that each functional unit is allocated a dedicated portion of the register file 420. In another embodiment, the register file 420 is divided between the different warps being executed by the SM 340. The register file 420 provides temporary storage for operands connected to the data paths of the functional units.

Each SM 340 comprises L processing cores 450. In an embodiment, the SM 340 includes a large number (e.g., 128, etc.) of distinct processing cores 450. Each core 450 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 450 include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the cores 450. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 340 also comprises M SFUs 452 that perform special functions (e.g., attribute evaluation, reciprocal square root, and the like). In an embodiment, the SFUs 452 may include a tree traversal unit configured to traverse a hierarchical tree data structure. In an embodiment, the SFUs 452 may include texture unit configured to perform texture map filtering operations. In an embodiment, the texture units are configured to load texture maps (e.g., a 2D array of texels) from the memory 204 and sample the texture maps to produce sampled texture values for use in shader programs executed by the SM 340. In an embodiment, the texture maps are stored in the shared memory/L1 cache 370. The texture units implement texture operations such as filtering operations using mip-maps (i.e., texture maps of varying levels of detail). In an embodiment, each SM 240 includes two texture units.

Each SM 340 also comprises N LSUs 454 that implement load and store operations between the shared memory/L1 cache 470 and the register file 420. Each SM 340 includes an interconnect network 480 that connects each of the functional units to the register file 420 and the LSU 454 to the register file 420, shared memory/L1 cache 470. In an embodiment, the interconnect network 480 is a crossbar that can be configured to connect any of the functional units to any of the registers in the register file 420 and connect the LSUs 454 to the register file and memory locations in shared memory/L1 cache 470.

The shared memory/L1 cache 470 is an array of on-chip memory that allows for data storage and communication between the SM 340 and the primitive engine 335 and between threads in the SM 340. In an embodiment, the shared memory/L1 cache 470 comprises 128 KB of storage capacity and is in the path from the SM 340 to the partition unit 280. The shared memory/L1 cache 470 can be used to cache reads and writes. One or more of the shared memory/L1 cache 470, L2 cache 360, and memory 204 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 470 enables the shared memory/L1 cache 470 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 2, are bypassed, creating a much simpler programming model. In the general purpose parallel computation configuration, the work distribution unit 225 assigns and distributes blocks of threads directly to the DPCs 320. The threads in a block execute the same program, using a unique thread ID in the calculation to ensure each thread generates unique results, using the SM 340 to execute the program and perform calculations, shared memory/L1 cache 470 to communicate between threads, and the LSU 454 to read and write global memory through the shared memory/L1 cache 470 and the memory partition unit 280. When configured for general purpose parallel computation, the SM 340 can also write commands that the scheduler unit 220 can use to launch new work on the DPCs 320.

The PPU 200 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 200 is embodied on a single semiconductor substrate. In another embodiment, the PPU 200 is included in a system-on-a-chip (SoC) along with one or more other devices such as additional PPUs 200, the memory 204, a reduced instruction set computer (RISC) CPU, a memory management unit (MMU), a digital-to-analog converter (DAC), and the like.

In an embodiment, the PPU 200 may be included on a graphics card that includes one or more memory devices 204. The graphics card may be configured to interface with a PCIe slot on a motherboard of a desktop computer. In yet another embodiment, the PPU 200 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 4B:
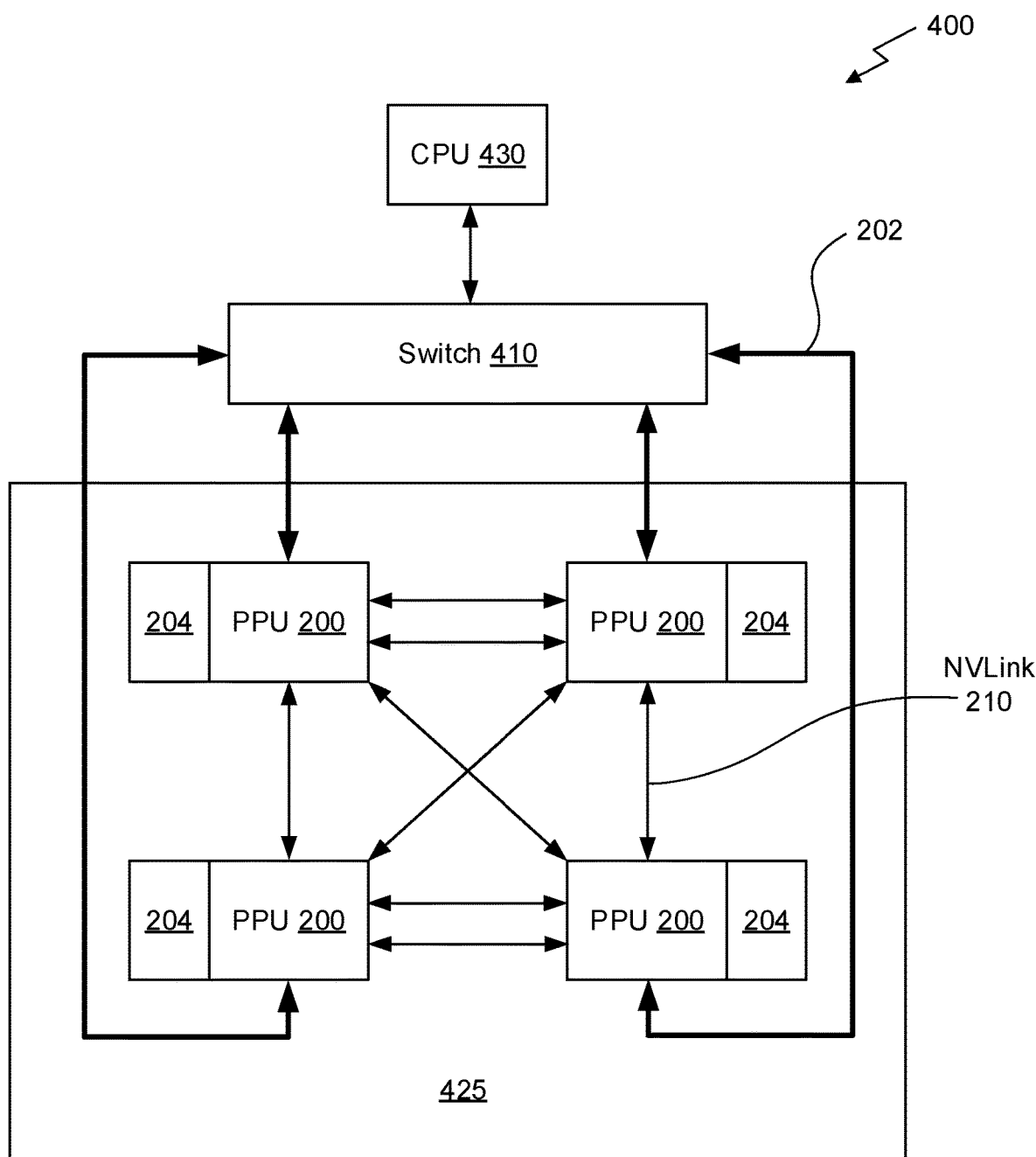
FIG. 4B is a conceptual diagram of a processing system implemented using the PPU of FIG. 2, in accordance with an embodiment.

FIG. 4B is a conceptual diagram of a processing system 400 implemented using the PPU 200 of FIG. 2, in accordance with an embodiment. The exemplary system 465 may be configured to implement the method 100 shown in FIG. 1. The processing system 400 includes a CPU 430, switch 410, and multiple PPUs 200 each and respective memories 204. The NVLink 210 provides high-speed communication links between each of the PPUs 200. Although a particular number of NVLink 210 and interconnect 202 connections are illustrated in FIG. 4B, the number of connections to each PPU 200 and the CPU 430 may vary. The switch 410 interfaces between the interconnect 202 and the CPU 430. The PPUs 200, memories 204, and NVLinks 210 may be situated on a single semiconductor platform to form a parallel processing module 425. In an embodiment, the switch 410 supports two or more protocols to interface between various different connections and/or links.

In another embodiment (not shown), the NVLink 210 provides one or more high-speed communication links between each of the PPUs 200 and the CPU 430 and the switch 410 interfaces between the interconnect 202 and each of the PPUs 200. The PPUs 200, memories 204, and interconnect 202 may be situated on a single semiconductor platform to form a parallel processing module 425. In yet another embodiment (not shown), the interconnect 202 provides one or more communication links between each of the PPUs 200 and the CPU 430 and the switch 410 interfaces between each of the PPUs 200 using the NVLink 210 to provide one or more high-speed communication links between the PPUs 200. In another embodiment (not shown), the NVLink 210 provides one or more high-speed communication links between the PPUs 200 and the CPU 430 through the switch 410. In yet another embodiment (not shown), the interconnect 202 provides one or more communication links between each of the PPUs 200 directly. One or more of the NVLink 210 high-speed communication links may be implemented as a physical NVLink interconnect or either an on-chip or on-die interconnect using the same protocol as the NVLink 210.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 425 may be implemented as a circuit board substrate and each of the PPUs 200 and/or memories 204 may be packaged devices. In an embodiment, the CPU 430, switch 410, and the parallel processing module 425 are situated on a single semiconductor platform.

In an embodiment, the signaling rate of each NVLink 210 is 20 to 25 Gigabits/second and each PPU 200 includes six NVLink 210 interfaces (as shown in FIG. 4B, five NVLink 210 interfaces are included for each PPU 200). Each NVLink 210 provides a data transfer rate of 25 Gigabytes/second in each direction, with six links providing 300 Gigabytes/second. The NVLinks 210 can be used exclusively for PPU-to-PPU communication as shown in FIG. 4B, or some combination of PPU-to-PPU and PPU-to-CPU, when the CPU 430 also includes one or more NVLink 210 interfaces.

In an embodiment, the NVLink 210 allows direct load/store/atomic access from the CPU 430 to each PPU's 200 memory 204. In an embodiment, the NVLink 210 supports coherency operations, allowing data read from the memories 204 to be stored in the cache hierarchy of the CPU 430, reducing cache access latency for the CPU 430. In an embodiment, the NVLink 210 includes support for Address Translation Services (ATS), allowing the PPU 200 to directly access page tables within the CPU 430. One or more of the NVLinks 210 may also be configured to operate in a low-power mode.

Figure 4C:
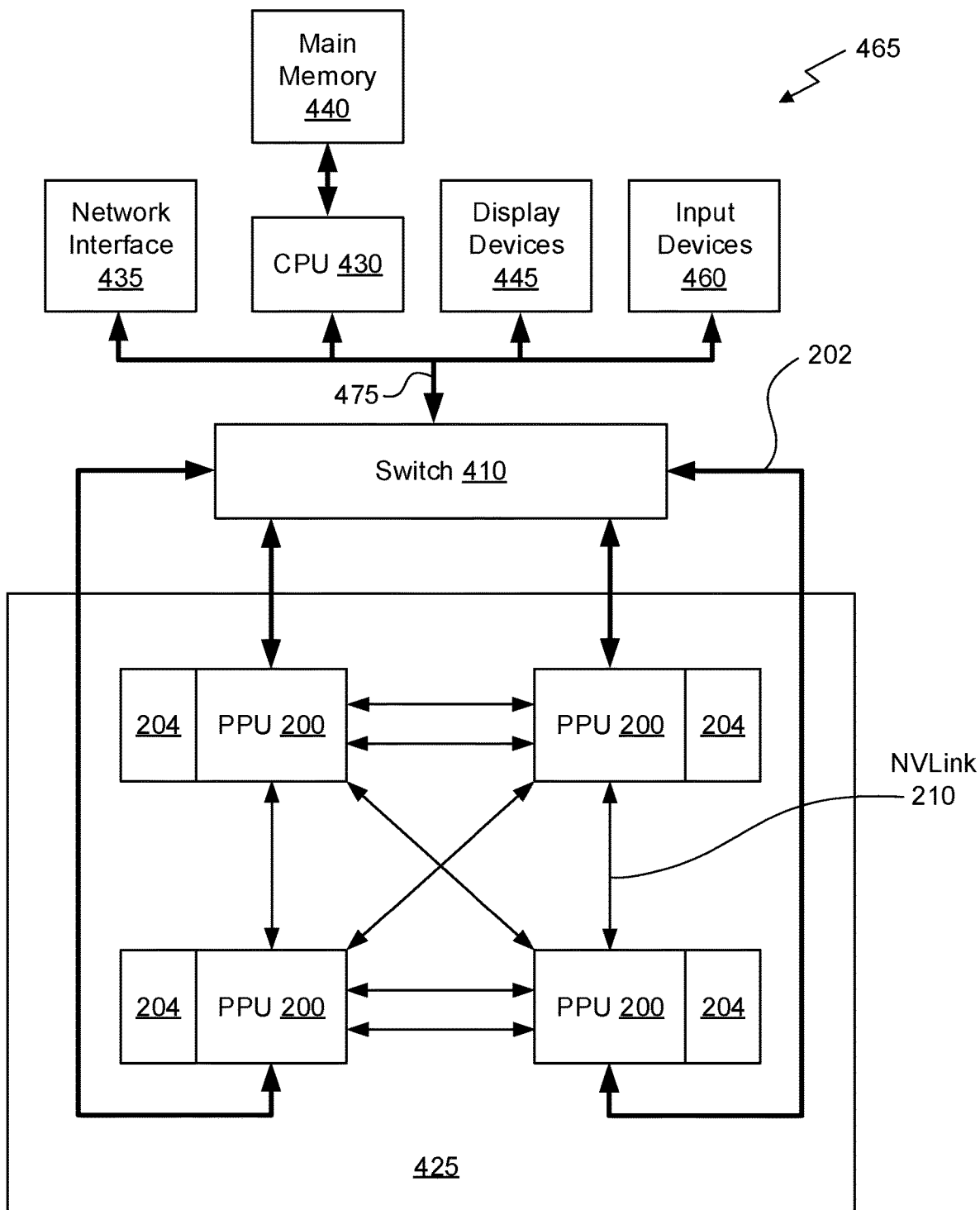
FIG. 4C illustrates an exemplary system in which the various architecture and/or functionality of the various previous embodiments may be implemented.

FIG. 4C illustrates an exemplary system 465 in which the various architecture and/or functionality of the various previous embodiments may be implemented. The exemplary system 465 may be configured to implement the method 100 shown in FIG. 1.

As shown, a system 465 is provided including at least one central processing unit 430 that is connected to a communication bus 475. The communication bus 475 may be implemented using any suitable protocol, such as PCI (Peripheral Component Interconnect), PCI-Express, AGP (Accelerated Graphics Port), HyperTransport, or any other bus or point-to-point communication protocol(s). The system 465 also includes a main memory 440. Control logic (software) and data are stored in the main memory 440 which may take the form of random-access memory (RAM).

The system 465 also includes input devices 460, the parallel processing system 425, and display devices 445, i.e. a conventional CRT (cathode ray tube), LCD (liquid crystal display), LED (light emitting diode), plasma display or the like. User input may be received from the input devices 460, e.g., keyboard, mouse, touchpad, microphone, and the like. Each of the foregoing modules and/or devices may even be situated on a single semiconductor platform to form the system 465. Alternately, the various modules may also be situated separately or in various combinations of semiconductor platforms per the desires of the user.

Further, the system 465 may be coupled to a network (e.g., a telecommunications network, local area network (LAN), wireless network, wide area network (WAN) such as the Internet, peer-to-peer network, cable network, or the like) through a network interface 435 for communication purposes.

The system 465 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 440 and/or the secondary storage. Such computer programs, when executed, enable the system 465 to perform various functions. The memory 440, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 465 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Machine Learning

Deep neural networks (DNNs) developed on processors, such as the PPU 200 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected perceptrons (e.g., nodes) that can be trained with enormous amounts of input data to quickly solve complex problems with high accuracy. In one example, a first layer of the DLL model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 200. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 200 is a computing platform capable of delivering performance required for deep neural network-based artificial intelligence and machine learning applications.

Exemplary Crosstalk Analysis Environment

Figure 5:
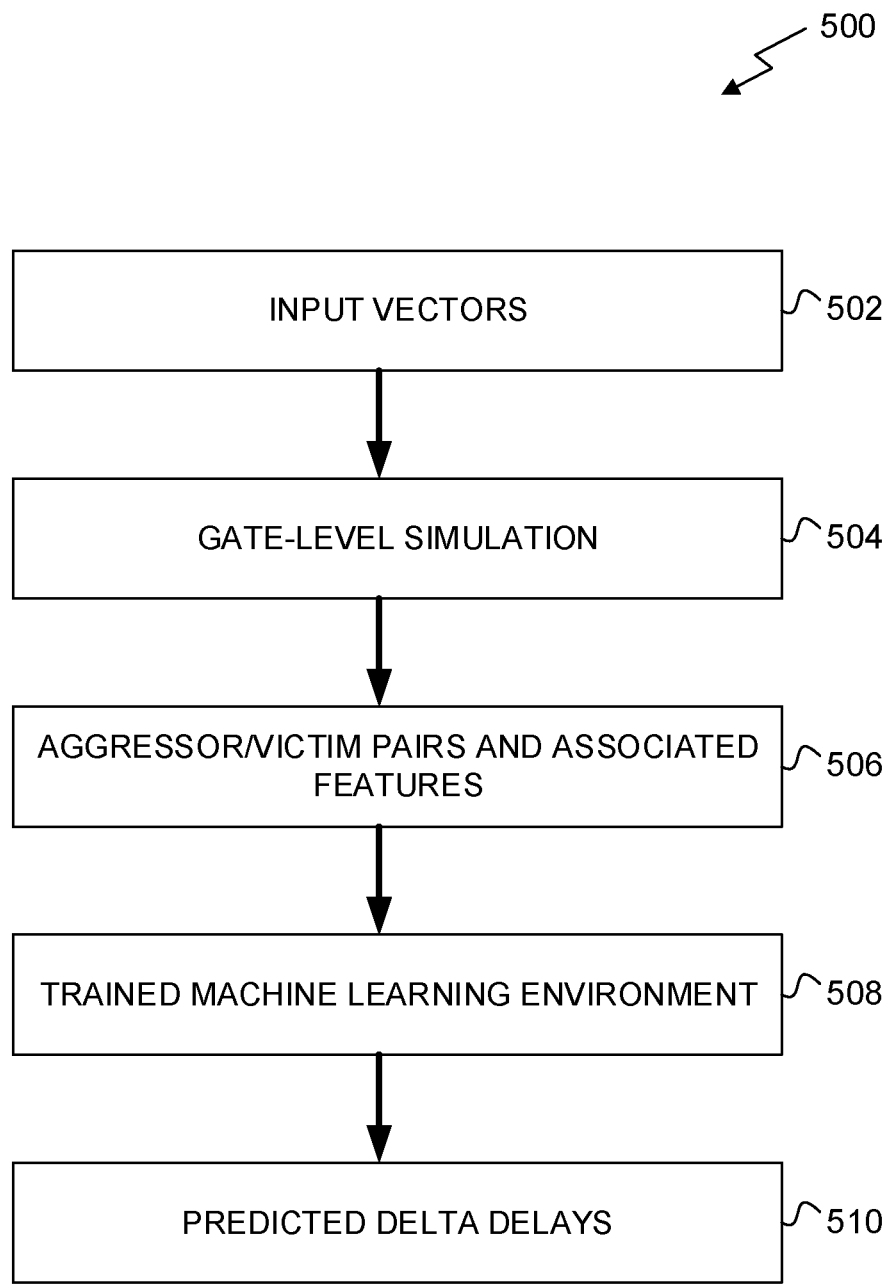
FIG. 5 illustrates an exemplary crosstalk analysis environment, in accordance with an embodiment.

FIG. 5 illustrates an exemplary crosstalk analysis environment 500, according to one exemplary embodiment. As shown, a plurality of input vectors 502 are input into a gate-level simulation 504. In response, the gate-level simulation 504 may determine timing windows for all nets within the IC design, may perform aggressor pruning, and may then determine and output aggressor/victim pairs and associated features 506 for the IC design. In one embodiment, the gate-level simulation 504 may be accelerated utilizing one or more graphics processor units (GPUs).

Additionally, the aggressor/victim pairs and associated features 506 for the IC design are then input into a trained machine learning environment 508, which outputs predicted delta delays 510 for each of the aggressor/victim pairs.

Further, the crosstalk analysis environment 500 may be implemented in one or more hardware computing devices, in a distributed computing environment, in a cloud computing environment, etc.

In this way, the crosstalk analysis environment 500 may improve a more accurate, more efficient crosstalk analysis when compared to previous methods.

Crosstalk Pessimism Reduction Using GPU-Accelerated Gate Simulation and Machine Learning In one embodiment, dynamic simulation and machine learning may be used to eliminate crosstalk signoff pessimism while maintaining accuracy. A GPU-accelerated variation-aware gate-level simulation of the design is determined with a large number of random input vectors to search on a per-net basis for the worst-case number of aggressor nets that toggle at the same time as the victim net. This worst-case number of aggressor nets may be smaller than the total number of aggressors, showing that many aggressor-victim pairs can be eliminated, reducing pessimism.

Static analyses may assume that all aggressors and victims toggle simultaneously with perfectly-aligned transitions, which is a simplifying but pessimistic assumption. In one embodiment, data from SPICE may be used to develop a machine learning model that can use the actual arrival times determined from the gate-level simulation to predict the true worst-case crosstalk impact. Because in practice aggressor transitions do not all perfectly align with the victim transition, applying these more accurate delta delays to the signoff tool improves accuracy and reduces pessimism.

In one embodiment, an aggressor net may include any net which has capacitive coupling with the net being analyzed. Additionally, a victim net may include a net whose delay is being analyzed. Bump may include a measure of the impact aggressor A has on victim B (e.g., as measured by a percentage of VDD).

In another embodiment, a combinational gate simulator that runs on GPUs may be used to create timing windows to find simultaneous switching. Also, aggressor pruning may be implemented. For example, logical-correlation-based pruning may occur, where if the aggressor never switches in the opposite direction of the victim in a large sampling of vectors, then the aggressor is false. Also, distance-based pruning may occur, where if the aggressor switches 150 ps before the victim or if the aggressor switches 50 ps after the victim in a large sampling of vectors, then the aggressor is false.

In this way, GPU accelerated delay annotated gate-level simulations may be used to prune aggressor victim pairs. Additionally, a machine learning-based delta delay predictor may be used to overcome aggressor alignment pessimism.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The disclosure may be described in the general context of computer code or machine-usable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising, at a device:
   performing a gate-level simulation of an integrated circuit (IC) design to obtain a plurality of aggressor/victim pairs for the IC design, wherein the gate-level simulation performs at least one of:
   logical correlation-based pruning where aggressor nets and victim nets having signal transitions that do not overlap are excluded from the aggressor/victim pairs obtained for the IC design, or
   distance-based pruning where aggressor nets and victim nets that switch more than a predetermined time threshold apart from each other are excluded from the aggressor/victim pairs obtained for the IC design; and
   processing the plurality of aggressor/victim pairs, by a machine learning model, to predict a delta delay for each of the plurality of aggressor/victim pairs.

2. The method of claim 1, wherein the IC design includes a partition of an overall IC design.

3. The method of claim 1, wherein the gate-level simulation is accelerated utilizing one or more graphics processor units (GPUs).

4. The method of claim 1, wherein a plurality of input vectors are input into the gate-level simulation.

5. The method of claim 1, wherein given a plurality of input vectors, the gate-level simulation determines timing windows for one or more nets within the IC design.

6. The method of claim 1, wherein the gate-level simulation determines and outputs aggressor/victim pairs for the IC design, where for each of the output aggressor/victim pairs:
   an aggressor net is capacitively coupled with a victim net, and signal transitions of the aggressor net and the victim net overlap.

7. The method of claim 1, wherein the gate-level simulation performs the logical correlation-based pruning.

8. The method of claim 1, wherein the gate-level simulation performs the distance-based pruning.

9. The method of claim 1, wherein the gate-level simulation determines and outputs associated features for each of the plurality of aggressor/victim pairs, wherein the features for at least one of the aggressor/victim pairs includes one or more of:
a victim slew value,
an aggressor slew value,
a bump value indicating a percentage of a voltage of a victim net that is perturbed due to an aggressor net,
victim load indicating a load capacitance on the victim net, or
a relative distance between switching times of the aggressor net and the victim net.

10. The method of claim 1, wherein the machine learning model takes each of the plurality of aggressor/victim pairs, as well as associated features for each pair, as input, wherein the features for at least one of the aggressor/victim pairs includes one or more of:
a victim slew value,
an aggressor slew value,
a bump value indicating a percentage of a voltage of a victim net that is perturbed due to an aggressor net,
victim load indicating a load capacitance on the victim net, or a relative distance between switching times of the aggressor net and the victim net.

11. The method of claim 1, further comprising at the device:
training the machine learning model.

12. A system comprising:
a hardware processor of a device that is configured to:
perform a gate-level simulation of an integrated circuit (IC) design to obtain a plurality of aggressor/victim pairs for the IC design, wherein the gate-level simulation performs at least one of:
logical correlation-based pruning where aggressor nets and victim nets having signal transitions that do not overlap are excluded from the aggressor/victim pairs obtained for the IC design, or
distance-based pruning where aggressor nets and victim nets that switch more than a predetermined time threshold apart from each other are excluded from the aggressor/victim pairs obtained for the IC design; and
process the plurality of aggressor/victim pairs, by a machine learning model, to predict a delta delay for each of the plurality of aggressor/victim pairs.

13. The system of claim 12, wherein the IC design includes a partition of an overall IC design.

14. The system of claim 12, wherein the gate-level simulation is accelerated utilizing one or more graphics processor units (GPUs).

15. The system of claim 12, wherein a plurality of input vectors are input into the gate-level simulation.

16. The system of claim 12, wherein given a plurality of input vectors, the gate-level simulation determines timing windows for one or more nets within the IC design.

17. The system of claim 12, wherein the gate-level simulation determines and outputs aggressor/victim pairs for the IC design, based on timing windows for one or more nets within the IC design.

18. A non-transitory computer-readable storage medium storing instructions that, when executed by a processor of a device, causes the processor to cause the device to:
perform a gate-level simulation of an integrated circuit (IC) design to obtain a plurality of aggressor/victim pairs for the IC design, wherein the gate-level simulation performs at least one of:
logical correlation-based pruning where aggressor nets and victim nets having signal transitions that do not overlap are excluded from the aggressor/victim pairs obtained for the IC design, or
distance-based pruning where aggressor nets and victim nets that switch more than a predetermined time threshold apart from each other are excluded from the aggressor/victim pairs obtained for the IC design; and
process the plurality of aggressor/victim pairs, by a machine learning model, to predict a delta delay for each of the plurality of aggressor/victim pairs.

19. The computer-readable storage medium of claim 18, wherein the gate-level simulation is accelerated utilizing one or more graphics processor units (GPUs).

\* \* \* \* \*